March 19, 1963 M. P. CIRCUIT 3,082,379
AMPLITUDE SELECTION CIRCUIT
Filed March 22, 1960
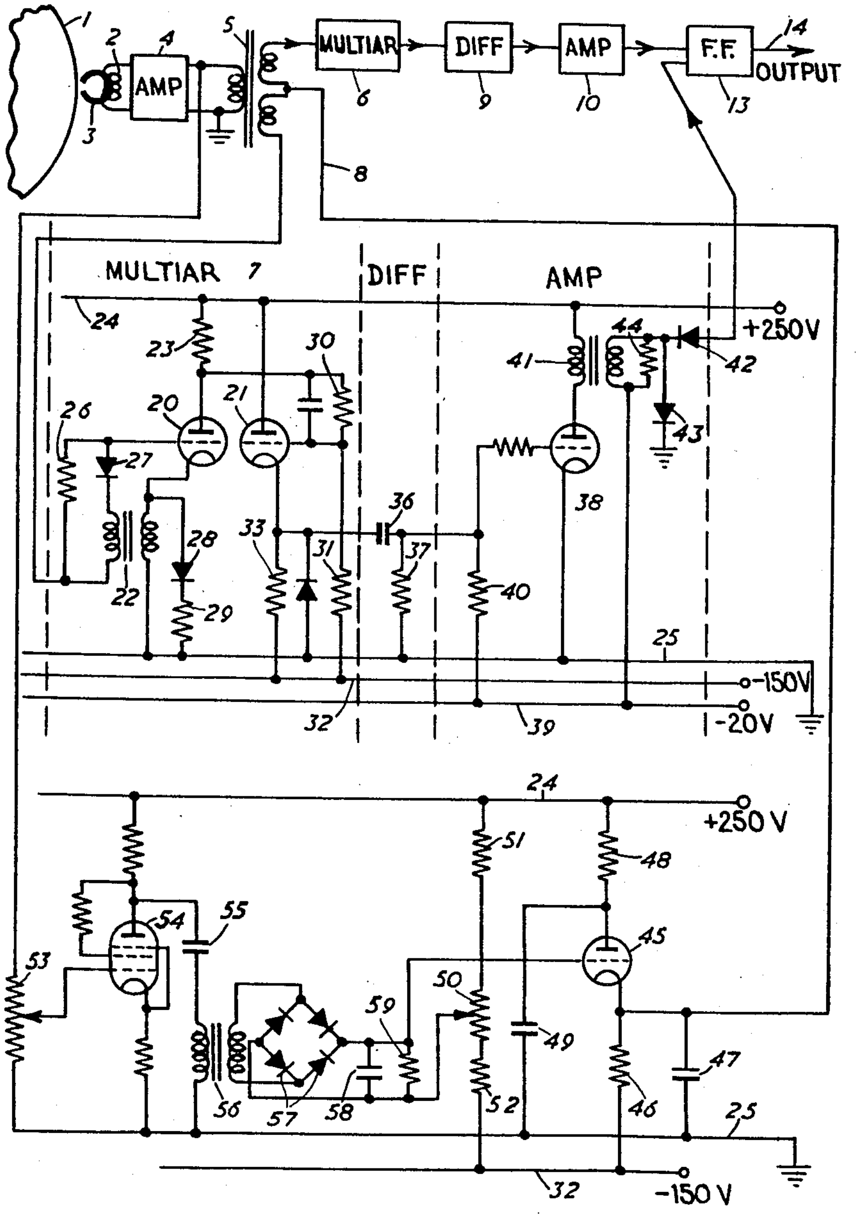
INVENTOR
MARTIN PHILIP CIRCUIT
BY Hane and Nydick
ATTORNEYS United States Patent Office 3,082,379

Patented Mar. 19, 1963

3,082,379

AMPLITUDE SELECTION CIRCUIT

Martin Philip Circuit, Hitchin, England, assignor to International Computers and Tabulators Limited Filed Mar. 22, 1960, Ser. No. 16,696
Claims priority, application Great Britain Mar. 26, 1959
8 Claims. (Cl. 328—147)

This invention relates to electronic apparatus for providing an output signal each time an input signal exceeds a predetermined amplitude.

It is frequently necessary to detect when the amplitude of a varying input waveform exceeds a selected amplitude. This is usually known as amplitude selection or comparison. A number of circuits for performing this function are described in chapter 9 of vol. 19 of the Radiation Laboratory Series published by McGraw-Hill Book Company, Inc. It is desirable that the input signal should have a constant peak amplitude and a high signal to noise ratio. This ensures that the amplitude selection circuit will not fail to operate because a peak falls below the selected amplitude nor will it be operated incorrectly by a noise signal. Furthermore, the mean D.C. level of the input signal should remain constant since the amplitude comparison takes place against a fixed D.C. reference voltage level. Failure to satisfy any of these conditions reduces the operating tolerances of the circuit and increases the chance that the circuit will occasionally operate incorrectly.

It is the object of the invention to provide an improved voltage amplitude selection circuit with an increased tolerance to non-significant variations in the amplitude of the input signal.

According to the invention a voltage amplitude selection circuit includes a source of reference voltage, a voltage amplitude selector responsive to the reference voltage and to an input signal to generate an output signal each time the amplitude of the input signal exceeds a selected voltage, control means responsive to the input signal to generate a control signal the amplitude of which is determined by the average amplitude of the input signal, and means for applying the control signal to the reference voltage source to vary the reference voltage in accordance with the average amplitude of the input signal.

The invention will now be described, by way of example, with reference to the accompanying drawing which shows an amplitude selection arrangement which is suitable for use with signals derived from the reading of magnetic recordings of digital signals.

It is often necessary to perform amplitude selection on waveforms derived from the reading of magnetically recorded digit representing signals. It is common practice to switch any one of a number of reading heads to a single reading amplifier, particularly in magnetic drum storage devices. The amplitude of signals from different heads may differ appreciably due to minor differences in the construction of the heads, the accumulation of magnetic particles in the head gap, the non-uniformity of the recording surface, and differences in the spacing of the heads in out-of-contact reading systems. Further variations of the peak amplitude of individual digit signals occurs in non-return to zero recording systems, and also in return to zero recording with high packing densities, because certain digit sequences can produce a temporary change in the mean D.C. level of the reading signal.

The undesired variations in amplitude of the reading signal arising from the causes given above make it difficult to design a conventional amplitude selection circuit using a fixed reference voltage which will operate satisfactorily in a reading amplifier. Furthermore the signals from individual digits are approximately sinusoidal, so that changes in amplitude of the signal can produce appreciable changes in the relative time at which the signal reaches the reference voltage and causes the circuit to generate an output signal. This variation in relative timing of the output signal makes more difficult the determination of the digital significance of the signals.

The drawing shows the use of two controlled amplitude selectors in an arrangement for reading digit signals recorded on the surface of a magnetic storage drum 1, each of the amplitude selectors being controlled by a reference voltage which is continuously adjusted in accordance with the average amplitude of the input signal.

Signals are induced in winding 2 of head 3 as the magnetised surface of the drum 1 moves past the head. These signals are fed to the input of a conventional amplifier 4. The output signals from the amplifier are fed to the primary of a transformer 5.

It is required that amplitude selection should be effected on both positive and negative peaks of the input signal waveform. The multiar amplitude selection circuits 6 and 7 are employed, one operating on positive peaks and the other operating on negative peaks. Other forms of amplitude selection circuit may be used instead of the multiar, but the multiar is preferred in this application because it provides relatively high accuracy of selection and an output pulse of large amplitude and short rise time.

The multiar circuits 6 and 7 are each fed from a secondary winding on the transformer 5. The same reference voltage is fed to both multiar circuits from line 8, via the secondary windings of the transformer. The two secondary windings are connected in opposite phase, so that the multiar 6 operates on positive peaks of the input signal and the multiar 7 operates on the negative peaks of the input signal.

The pulse produced by the multiar 6 when the input signal exceeds the reference voltage is fed through a differentiating circuit 9 to an amplifier 10. The output pulses from the amplifier 10 are applied to one input of a conventional bi-stable flip-flop 13 utilising a pair of cross coupled triodes. Thus, a positive peak of the input signal causes the flip-flop 13 to be switched on by a pulse from the amplifier 10. An output line 14 is connected to one anode of the flip-flop 13 and the potential of this line is therefore indicative of the state of the flip-flop.

The multiar 7 provides an input to the flip-flop 13 on negative peaks of the input signal, through a differentiator and amplifier which correspond to the differentiator 9 and the amplifier 10. The multiar 7 and the associated differentiator and amplifier are shown in detail in the drawing.

The multiar 7 consists of a triode 20, which acts as the multiar amplifier, and a triode 21, which acts as an output cathode follower. The mode of operation of the multiar circuit is described in detail on pages 343–4 of the book "Waveforms" which was referred to earlier. Briefly, a transformer 22 is connected to provide a positive feedback coupling between the grid and cathode of the triode 20. However, the positive feedback path is normally broken by a diode 27 which is held in a non-conducting condition by the reference voltage applied to it from the line 8, through the windings of the transformers 5 and 22. The anode of the triode 20 is connected through a resistor 23 to a +250 v. supply line 24. The cathode of the triode is connected through one winding of the transformer 22 to a ground line 25. The reference voltage is applied to the grid of the triode through a relatively high value resistor 26, and is such that the triode is normally conducting heavily.

When a negative going input signal occurs, an amplified negative going signal appears across the secondary winding of the transformer 5 which feeds the multiar 7. When this amplified voltage equals the reference voltage the diode 27 conducts and completes the feedback path for the triode 20. The triode is therefore driven to cut off very rapidly by the positive feedback. A diode 28 and a resistor 29 are connected across the cathode winding of the transformer 22 to damp the transformer to prevent overshoot.

The anode of the multiar triode is connected through resistors 30 and 31 to a −150 v. supply line 32. The grid of the cathode follower triode 21 is connected to the junction of the resistors 30 and 31. The cathode of the triode 21 is connected through a resistor 33 to the negative line 24 and through a diode 34 to the ground line 25. The diode 34 prevents the cathode of the triode 21 falling below ground potential.

The regenerative cut off of the triode 20 causes the anode voltage to rise. This change in voltage is applied to the grid of the triode 21 through the resistor 30. Consequently, a fast positive going waveform appears across the cathode resistor 33. The rise time of the waveform is improved by a small capacitor 35 which is connected in parallel with the resistor 30.

The positive going waveform at the cathode of the triode 21 is fed to a differentiating circuit formed by a capacitor 36 and a resistor 37. This circuit produces a positive "spike" coincident with the leading edge of the cathode waveform. This "spike" is applied to the grid of a triode 38 to cause it to conduct heavily. The triode 38 is normally held non-conducting by a bias voltage applied to the grid from a bias line 39 through a resistor 40.

The primary winding of a transformer 41 is connected in the anode circuit of the triode 38. One end of the secondary winding is connected to the bias line 39 and the other end is connected through a diode 42 to the other input of the flip-flop 13. A diode 43 is connected from the junction of the diode 42 and the transformer secondary winding to prevent this junction going positive with respect to ground. The transformer secondary winding is damped by a resistor 44. The momentary flow of anode current in the triode 38 produces a negative pulse in the secondary of the transformer 41. This pulse is passed by the diode 42 to the flip-flop 13 to switch it off.

The reference voltage on the line 8 is provided by a cathode follower triode 45. The line 8 is connected to the cathode of the triode which is also connected through a resistor 46 to the negative supply line 32. The line 8 is by-passed to ground by a capacitor 47. The anode of the triode is connected through a resistor 48 to the positive supply line 24 and is by-passed to ground by a capacitor 49.

The standing voltage of the cathode of the triode, which forms the reference voltage is set by adjustment of the slider of a potentiometer 50, which is connected through resistors 51 and 52 to the positive and negative supply lines, respectively. The voltage at the potentiometer slider is applied to the grid of the triode 45, together with a voltage derived from the input signal.

The amplified input signals which appear across the primary of the transformer 5 are fed to a potentiometer 53, the other end of which is connected to ground. The slider of the potentiometer is connected to the control grid of a pentode 54, which operates as a conventional cathode-biased amplifier. The signals at the anode of the pentode are fed through a capacitor 55 to the primary of a transformer 56. The secondary of the transformer is connected to a full-wave bridge rectifier consisting of four diodes 57. The rectified voltage from the bridge rectifier is applied to an integrating circuit formed by capacitor 58 and resistor 59 in parallel. The slider of the potentiometer 50 is connected to one side of the integrating circuit and the grid of the triode 45 is connected to the other side of the integrating circuit. In this way the voltage applied to the control grid is the sum of the standing voltage set by the potentiometer 50 and the voltage derived from the input signal by rectification and integration.

It is convenient to set the standing reference voltage at a level which is just sufficient to prevent the multiar circuits being triggered by the random noise signals which are present when no recorded digit signals are being sensed by the head 3. The potentiometer 53 is adjusted, whilst recorded digits are being read, so that the multiar circuits are triggered when the input signal reaches two thirds, for example, of the peak amplitude. Under these conditions, the rectified voltage provided by the bridge rectifier is sufficient to increase the reference voltage from just above random noise level to two thirds of the peak amplitude of the signals applied to the multiar conduits. If the peak amplitude of the input signal changes, due to variations in the recording surface or to the connection of the amplifier 4 to another reading head, for example, then the rectified voltage will change in a corresponding manner. The reference voltage will thus change correspondingly to ensure that the multiar circuits will trigger at substantially the same point of the input waveform over a wide range of peak amplitudes of the input signal.

The time constant of the integrating circuit determines the rate at which the reference voltage changes in response to a change in the input signal. This time constant must not be too small or the reference voltage will tend to follow changes in the input signal corresponding to individual digits. On the other hand, if the time constant is too long, the reference voltage will fail to follow short term variations in the input signal such as might arise from variations in the magnetic surface. The time constant of the control circuit which determines the changes in the reference voltage must be such that the control voltage follows the average amplitude of the input signal. The average amplitude may be defined as being substantially independent of the significant variations in the input signal and dependent on the non-significant variations. In the example considered, the amplitude variations corresponding to each digit are the significant variations, and the amplitude variations due to differences in the recording surface or the spacing between the head and the recording surface, for example, are the non-significant variations. A time constant equal to the duration of approximately two hundred digit signals was found to be satisfactory in one particular case when digit signals with a packing density of the order of 1000 digits to the inch were read from the drum 1. It was found that the circuit described operated satisfactorily with variations in the input signal of a magnitude sufficient to cause repeated faulty operation of a reading circuit which had no self-adjusting feature in relation to input signal amplitude.

As mentioned earlier, other forms of amplitude selector circuit, such as the blocking oscillator comparator described on page 342 of "Waveforms," which require a reference voltage may be utilised instead of the multiar circuits. It will be appreciated that a single chain of circuits such as 6, 9 and 10 is sufficient if an output is required for input signals of one polarity only.

I claim:

1. A voltage amplitude selection circuit comprising a source of reference voltage, a first voltage amplitude selector responsive to said reference voltage and positive parts of an input signal to generate an output signal each time the amplitude of said positive parts exceeds said reference voltage, a second voltage amplitude selector responsive to said reference voltage and negative parts of the input signal to generate an output signal each time the amplitude of said negative parts exceeds said reference voltage, means responsive to the input signal for generating a control signal representing the average amplitude thereof, and means responsive to the control signal to vary said reference voltage in accordance with the average amplitude of the input signal.

2. A voltage amplitude selection circuit according to claim 1, in which the control-signal-generating means comprises rectifier means, and integrator means responsive to the rectifier output signal to produce said reference signal.

3. A voltage amplitude selection circuit comprising a source of first reference voltage, a full wave rectifier bridge circuit responsive to said first reference voltage and an input signal, integrator means responsive to the rectifier bridge circuit output to generate a second reference voltage, a first voltage amplitude selector responsive to said second reference voltage and positive parts of the input signal to generate an output signal each time the amplitude of said positive parts exceed said second reference voltage, and a second voltage amplitude selector responsive to said second reference voltage and negative parts of the input signal to generate an output signal each time the amplitude of said negative parts exceeds said second reference voltage.

4. A voltage amplitude selection circuit according to claim 3, wherein said source of first reference voltage is manually settable to provide a predetermined voltage, and comprising adjustable means for applying a prescribed proportion of the input signal to said rectifier bridge circuit.

5. A voltage amplitude selection circuit according to claim 4, in which said first and second voltage amplitude selectors consist of multiar circuits.

6. A voltage amplitude selection circuit, comprising an input circuit; means to apply each signal of a train of input signals in turn to said input circuit; means to provide, during the application of each input signal, a first control voltage of value dependent upon the average amplitude of the immediately preceding input signals; means to provide a second control voltage; means to produce a reference signal in dependence upon the sum of said first and second control voltages; and an amplitude selector connected to said input circuit and responsive to each input signal applied to the input circuit and to the reference signal to generate an output signal when the amplitude of said input signal exceeds the reference signal value.

7. A voltage amplitude selection circuit, comprising an input circuit; means to apply each signal of a train of input signals in turn to said input circuit; a rectifying circuit operative to produce, during the application of each input signal, a unidirectional signal in dependence upon the average amplitude of the immediately preceding input signals; a source of a constant voltage of value which is preset in dependence upon the level of noise at the input circuit; means to produce a reference signal in dependence upon the sum of said constant voltage and said unidirectional signal; and a multiar circuit operative to generate an output signal when the amplitude of an input signal applied to said input circuit exceeds the reference signal value.

8. A voltage amplitude selection circuit, comprising an input circuit; means to apply in turn each signal of a train of positive and negative input signals to said input circuit; means to provide, during the application of each input signal, a first control voltage of value dependent upon the average amplitude of the immediately preceding input signals; means to provide a second control voltage; means to produce a reference signal in dependence upon the sum of said first and second control voltages; a first amplitude selector coupled to said input circuit and responsive to each positive input signal applied to the input circuit and to the reference signal to generate an output signal when the amplitude of said positive input signal exceeds the reference signal value; inverter means coupled to said input circuit to invert each negative input signal applied to said input circuit; and a second amplitude selector coupled to said inverter means and responsive to the inverted negative signal and to the reference signal to generate an output signal when the amplitude of the inverted negative signal exceeds the reference signal value.

References Cited in the file of this patent

UNITED STATES PATENTS

| | | |
|---|---|---|
| 1,937,783 | Place | Dec. 5, 1933 |
| 2,652,451 | Feten | Sept. 15, 1953 |
| 2,870,328 | Pomeroy | Jan. 20, 1959 |
| 2,934,707 | Heiser | Apr. 26, 1960 |